United States Patent [19]

Ogino

[11] Patent Number: 4,494,945

[45] Date of Patent: Jan. 22, 1985

[54] ROLLER CHAIN LINK CONSTRUCTION AND METHOD OF MANUFACTURE

[75] Inventor: Teiji Ogino, Ishikawa, Japan

[73] Assignee: Enuma Chain Manufacturing Co., Ltd., Japan

[21] Appl. No.: 344,043

[22] Filed: Jan. 29, 1982

[51] Int. Cl.[3] .......................... F16G 1/22; F16G 5/10; F16G 13/02

[52] U.S. Cl. .................................... 474/231; 474/218; 474/202; 474/206; 474/219

[58] Field of Search ............... 474/231, 222, 218, 227, 474/202, 206, 219; 59/5, 8, 35, 84; 411/2, 3, 39, 43, 424, 353, 519, 517

[56] References Cited

U.S. PATENT DOCUMENTS

| | | | |
|---|---|---|---|
| 1,235,321 | 7/1917 | James | 474/231 |
| 2,456,355 | 12/1948 | Aber | 411/360 |
| 2,553,646 | 5/1951 | Field | 474/231 |
| 2,647,023 | 7/1953 | Kubaugh | 474/231 |
| 3,194,612 | 7/1965 | Striepe | 474/231 |
| 3,222,977 | 12/1965 | Vaughn | 411/39 |
| 3,244,457 | 4/1966 | Ross | 305/11 |
| 3,262,353 | 7/1966 | Waeltz et al. | 411/39 |
| 3,276,308 | 10/1966 | Bergere | 411/43 |
| 3,290,982 | 12/1966 | Marschner | 411/39 |
| 3,379,072 | 4/1968 | Kuntzmann | 474/222 |
| 4,050,833 | 9/1977 | Briles | 411/424 |
| 4,263,779 | 4/1981 | Petershack | 59/84 |

FOREIGN PATENT DOCUMENTS

| | | | |
|---|---|---|---|
| 534277 | 3/1941 | United Kingdom | 474/231 |

*Primary Examiner*—Lawrence J. Staab
*Assistant Examiner*—Michael D. Bednarek
*Attorney, Agent, or Firm*—McGlew and Tuttle

[57] ABSTRACT

A power transmission roller chain link construction comprises a first link pin plate with a pair of spaced apart substantially parallel link pins secured to said plate in a press-fit so that they extend parallel to the plate. A bushing is fitted over each pin and a roller link plate is press-fitted on the bushing adjacent each of its ends. A roller is rotatably mounted on each bushing between the roller link plates. The link pins, link pin portion and a rod portion extending outwardly from each link pin portion beyond the second link plate, the second link plate being press-fitted to the link pin adjacent their opposite ends from the first link plate. The rod portion of each link pin has a threaded area adjacent the second link plate and a nut is threadably engageable on the threaded area. The link is manufactured by first press-fitting the link pins to the first pin link plate thereafter assembling the bushing with the roller link plates at each end over the pin and assembling a bushing between the plates. Thereafter a second pin link plate inserted over rod-like extensions of the link pins and press-fitted to the link pins in the same manner as the first link pin plate. Second link pin plate is tightened against the bushing assembly by a nut which is threaded on a threaded portion of the rod-like extension. A nut is threaded downwardly on a threaded portion of the rod-like extension which is adjacent to the second link plate so as to force the plate into position spaced by the same amount from the roller link plate as the first pin link plate. Preferably resilient O-rings are interposed between the associated roller link plates and the pin link plates. After securing the second pin plate in position by threading the nut along the threaded area of the rod portion, the rod portion is broken away from the remaining part of the assembly. Advantageously the resilient O-ring is also fitted into a groove formed on the associated link pins exteriorily of the second link plate.

7 Claims, 3 Drawing Figures

ROLLER CHAIN LINK CONSTRUCTION AND METHOD OF MANUFACTURE

FIELD AND BACKGROUND OF THE INVENTION

This invention relates in general to roller chain construction and in particular to a new and useful roller chain for power transmission with the link pins provided with rod-like extension for tight fastening of the link pin plates during assembly.

Conventionally, links of a roller chain are assembled such that pin link plates are loose-fitted to link pins and, as such, clips or split pins are used to prevent pin link plates from dropping off. It is known, however, that pin link plates thus located have a fatigue strength 30% lower than the other press-fitted portions of the links and are necessarily unable to withstand loads which are within the permissible limits for the press-fitted portions but exceed that for the loose-fitted pin link plates, thus reducing the life expectancy of the roller chain.

As is conventionally practiced in order to overcome such drawbacks, pin link plates may be press-fitted to link pins with expensive special tools that have to be purchased for infrequent use, or alternatively, may have been press-fitted in the factory in an endless form of a given size. These efforts, however, have all proved costly and time consuming.

SUMMARY OF THE INVENTION

It is thus an object of the invention to provide a roller chain wherein pin link plates can be easily press-fitted to link pins and safely located thereon.

In accordance with the invention a roller chain link is formed of link pins which are secured to a first pin link plate in space parallel relationship thereafter provided with bushings which are press-fitted thereto together with roller link plates disposed at each end of the bushing and a roller sleeve or cylinder which is rotatable on the bushing between the roller link plates. A second pin link plate is fitted over the associated pins in a press-fit and rod-like extensions of the pins are passed through the plates. The rod-like extensions carry threaded areas with a nut which is threadable along the areas so as to bear against the plate and force it into press-fitted assembly with the bushing and roller and thereafter the rod-like extension is broken away from the chain link assembly and the nut removed.

Accordingly, it is an object of the invention to provide an improved power transmission roller chain link in which the link pins are provided with rod-like extensions having a nut threadably engageable thereon which may be threaded along the extension so as to position the second link plate on the end of the associated link pins in a press-fit position.

A further object of the invention is to provide a method of assembling a roller chain link which includes pins which have a rod-like extension which are threaded so that nuts provided thereon may be threadably moved against a pin link plate to force it into a press-fitting relationship with the remainder of the link assembly.

A further object of the invention is to provide a power transmission roller chain line which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 3:
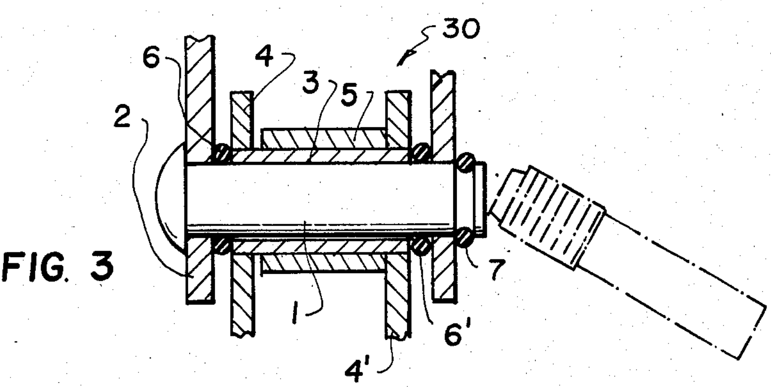
FIG. 3 is a view similar to FIG. 1 but showing the link plate press-fitted to the link pins and with the rod-like extension removed from the pins and the assembly provided with an O-ring at its outer end.

Referring to the drawings in particular the invention embodied therein comprises a power transmission roller chain link generally designated 30 which is shown in the assembled state in FIG. 3. The chain link 30 comprises a first pin link plate 2 in which a pair of spaced apart substantially parallel link pins 1 and 1' are secured by a press-fit adjacent their one ends. A bushing 3 is loosely fitted onto each pin 1 and 1' and a roller link plate 4 and 4' is press-fitted onto each end of the associated bushing 3. A roller or rotatable cylinder 5 is rotatably mounted on each bushing 3 between the roller link plates 4 and 4'.

In accordance with the invention, each link pin 1 has a link pin portion and rod-like portion 8 extending outwardly from the associated pin portion beyond a second pin link plate 2'. The second pin link plate 2' is press-firtted to the associated pin 1 and 1' and it is finally positioned on the pin by moving a nut 11 which is threadably engaged on a threaded area **8*a* of the rod extension portion 8. The nut is threaded in a direction toward the associated pin link plate 2' and advances the plate into an assembled position with the remainder of the assembly on the associated pins 1 and 1'**.

Figure 1:
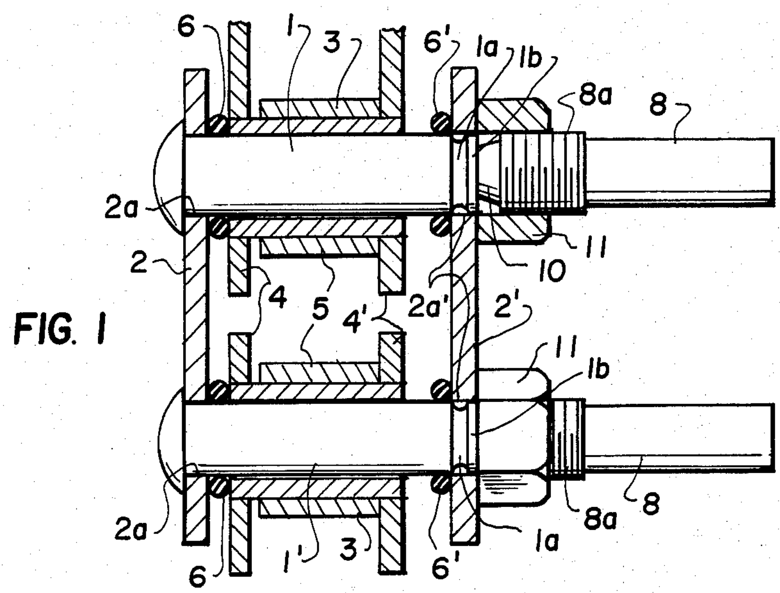
FIG. 1 is a transverse sectional view of a roller chain constructed in accordance with the invention showing the chain link in the course of construction with one pin link plate not yet press-fitted to the plate pin.

Referring to FIG. 1, each link of the roller chain according to the invention comprises a pair of link pins 1 and 1' and a pair of pin link plates 2 and 2' press-fitted on both ends of each link pin 1 and 1' to interconnect the pair of link pins 1 and 1'. Each link of the roller chain according to the invention is further provided with a bushing 3 rotatably sheathing each link pin 1. A pair of roller link plates 4 and 4' are press-fitted on respective ends of each bushing 3 to connect a link pin 1 in one link with a link pin 1' in another link. A cylinder or roller 5 is rotatable on each bushing 3 between roller link plates 4 and 4' and sheathes each bushing 3. A pair of axially spaced oil-sealing O-rings of an elastic material 6 and 6' is provided on each link pin 1 between roller link plate 4 and pin link plate 2 and between roller link plate 4' and pin link plate 2', respectively. Link pin 1 is formed with a head on one end and with a neck **1*a* adjacent to a rim 1*b* on the other end. Neck 1*a* serves to locate an elastic material made O-ring 7 for guarding press-fitted link plate 2' as shown in FIG. 3. A rod 8 is unitarily formed with each link pin 1 via a groove 10 and is provided with threads 8*a* adjacent to groove 10. Rim 1*b* of link pin 1 and threads 8*a* are both of such diameter that they can loosely pass through holes 2a and 2a' made in pin link plates 2 and 2' respectively. Groove 10 has an area of a cross-section large enough to withstand the reaction exerted thereon when pin link plate 2' is press-fitted to link pins 1. Further, groove 10 is heat treated to give it a brittleness so it may be broken by knocking rod 8 as described later. A nut 11 engages threads 8a**.

Figure 2:
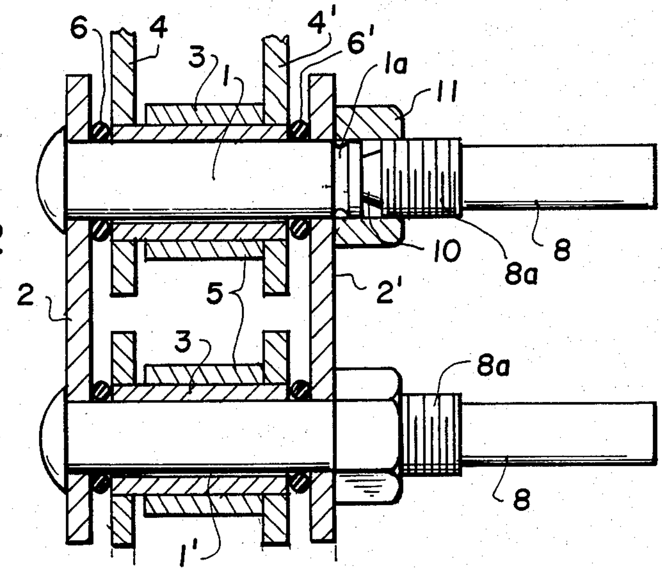
FIG. 2 is a view similar to FIG. 1 with the pin link plate press-fitted to the link pin.

The roller chain according to the invention is assembled as follows. With pin link plate 2 alreadv press-fitted to the pair of link pins 1, O-ring 6 first is provided on link pin 1, adjacent to pin link plate 2, whereon bushing 3 with roller link plate 4 and 4' press-fitted on both its ends and roller 5 rotatably provided between roller link plate 4 and 4' is loosely fitted to link pin 1, followed by another O-ring 6''. Pin link plate 2' is then passed loosely through rod 8 up to neck 1a of link pin 1, followed by nut 11 which is screwed onto threads 8a until it comes into contact with pin link plate 2' as shown in FIG. 1. Nut 11 is further tightened with a wrench, one nut alternatively with the other in the same link, until pin link plate 2' is press-fitted to and located at a given position of each link pin 1 as shown in FIG. 2.

Referring now to FIG. 3, upon removing nut 11, rod 8 is stuck with an instrument such as a hammer to be broken off from link pin 1 together with the reduced diameter portion forming the groove 10. Finally, O-ring 7 is fitted in neck 1a formed near the end of link pin 1 thereby to secure the location of pin link plate 2'. It is noted that the present invention may be applied to roller chains without oil-sealing O-rings provided.

The invention thus dispenses with the expensive special tools as required in the conventional roller chain to press-fit pin link plate to link pins, making it possible to press-fit pin link plates to link pins at small cost and without difficulty.

According to the invention, moreover, the permissible load to a given roller chain can be enhanced by about 30%, thus adding to the durability and practicability of the roller chain.

Also, while pin link plates can be firmly fixed to link pins by said press-fitting method, the user can be free from the danger that pin link plates thus fitted might come apart from their link pins, as the invention provides an O-ring, which when fitted at the neck-line portion formed near the end of the link pins, serves to secure the location of the pin link plates on the link pins.

While specific embodiments of the invention have been shown and described in detail to illustrate the application of the principles of the invention, it will be understood that the invention may be embodied otherwise without departing from such principles.

What is claimed is:

1. A power transmission roller chain link comprising: a first link plate having a pair of holes; a pair of spaced apart substantially parallel link pins press-fitted into said holes of said first link plate adjacent their one ends; a bushing fitted over each link pin; a roller link plate press-fitted on each bushing adjacent each end of each bushing; a roller rotatably mounted on each bushing between said roller link plates; a second link plate having a pair of holes to which are press-fitted said link pins adjacent their respective opposite ends; said link pins each having a link pin portion forming said one and opposite ends of said link pins, and a rod portion extending outwardly from said link pin portion beyond said second link plate, said rod portion having a threaded area adjacent said second link plate with a diameter of said rod portion and said threaded area being less than a diameter of said holes in said second link plate; a nut threadably engaged on said threaded area; and said link pins each including a heat-treated brittle groove portion of a diameter less than that of said rod portion and that of said threaded area, disposed between said pin link portion and said rod portion to facilitate the breaking away of said rod portion when said nut is spaced away from said groove portion.

2. A power transmission roller chain link according to claim 1, wherein said opposite end of each link pin portion of each link pin adjacent each brittle groove portion includes a neck positioned beyond said second link plate, said nut extending over said neck and over said groove portion and against said second link plate while said nut is at least partly threadably engaged with said threaded area to cover said neck and said groove portion before said groove portion is broken.

3. A power transmission roller chain link according to claim 1, including an O-ring disposed between each end of said bushing and the associated first and second pin link plate.

4. In a roller chain for power transmission having a plurality of links which each comprise a pair of link pins each having a head at one end and an opposite headless end, a pair of pin link plates having holes press-fitted to both ends of said link pins, a pair of bushings each provided between said pin link plates so as to rotatably sheathe said link pins respectively, a pair of roller link plates press-fitted on both ends of each of said bushings, and a pair of rollers each provided between said pair of roller link plates so as to rotatably sheathe said bushings respectively, the improvement comprising: a rod unitarily formed via a heat-treated groove with, and extended in a line from the headless end of each of said link pins, said rod being formed with screw threads of a diameter that loosely passes through the hole in said pin link plates, said rod being provided with a nut which engages said screw threads of the rod.

5. A method of assembling a power transmission roller chain link which includes a first pin link plate, first and second spaced-apart substantially parallel pins having first ends connected to the first pin link plate and opposite second ends with an extension having a threaded area with a heat-treated brittle groove area of diameter less than that of the threaded area and the groove area disposed between the thread area and the second end, comprising: applying a bushing over each of said first and second pins; applying a roller over said bushing together with a roller link plate adjacent each end of said roller and press-fitting roller link plates to respective ends of said bushing; thereafter passing the extension of the link pins through openings in a second link plate so as to position the threaded area of the link pin extension exteriorily of the second pin link plate, threadably engaging a nut on the threaded area of said extension to bear over said groove area and against said second link plate and to force said second link plate along the associated link pins to position it adjacent said bushing; threadably disengaging said nut from over said groove area; and thereafter breaking off the extension from the assembly at said groove area.

6. A method according to claim 5, including forming a groove on the end of each of said link pins and after braking away the extension of said link pins and positioning a resilient ring member in said groove exteriorily of said second pin link plate and of a diameter to bear against the sides of said second pin link plate.

7. A method according to claim 5, including positioning resilient ring members between said bushing and said first pin link plate and said bushing and said second pin link plate.

* * * * *